US009236797B2

(12) United States Patent
Chen et al.

(10) Patent No.: US 9,236,797 B2
(45) Date of Patent: Jan. 12, 2016

(54) BUCK-STORE AND BOOST-RESTORE CONVERTER

(71) Applicant: Industrial Technology Research Institute, Hsinchu (TW)

(72) Inventors: Ke-Horng Chen, Banqiao (TW); Chun-Yu Hsieh, Taichung (TW); Chih-Yu Yang, Daliao Township, Kaohsiung County (TW); Chao-Jen Huang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 265 days.

(21) Appl. No.: 14/143,021

(22) Filed: Dec. 30, 2013

(65) Prior Publication Data

US 2014/0111103 A1 Apr. 24, 2014

Related U.S. Application Data

(63) Continuation of application No. 12/773,140, filed on May 4, 2010, now abandoned.

(51) Int. Cl.
*H02M 3/156* (2006.01)
*H05B 33/08* (2006.01)

(52) U.S. Cl.
CPC ............ *H02M 3/156* (2013.01); *H02M 3/1563* (2013.01); *H05B 33/0815* (2013.01)

(58) Field of Classification Search
CPC . H02M 3/1582; H02M 3/1588; H02M 3/158; H02M 2001/007; H02M 3/155; H02M 2001/009; H02M 2003/072; H02M 3/156; H02M 3/1584; H02M 3/33561; Y02B 70/1466; Y02B 40/90; Y02B 70/126; B60L 2210/14; B60L 11/1887
See application file for complete search history.

(56) References Cited

U.S. PATENT DOCUMENTS 5,734,258 A 3/1998 Esser
7,298,119 B1 11/2007 Summit et al.
(Continued)

FOREIGN PATENT DOCUMENTS

TW 200826406 A 6/2008
TW 200923607 A 6/2009
(Continued)

OTHER PUBLICATIONS

Society for Information Display Digest of Technical Papers; 2009; pp. 1-4.
(Continued)

*Primary Examiner* — Adolf Berhane
*Assistant Examiner* — Henry Lee, III
(74) *Attorney, Agent, or Firm* — McClure, Qualey & Rodack, LLP (57) ABSTRACT

A system includes: a first converter for receiving a pre-stage input DC voltage from a power source, and providing a pre-stage output DC voltage including a first DC voltage or a second DC voltage; a modulator the modulator controlling the first converter; a second converter, coupled to the first converter; and a controller, the controller controlling an operation mode of the second converter and notifying the modulator about the operation mode of the second converter. The modulator and the controller receive an external voltage indication signal indicating whether the pre-stage output DC voltage is the first DC voltage or the second DC voltage. The modulator controls the first converter to output the pre-stage output DC voltage based on the voltage indication signal. The modulator notifies the controller about whether the pre-stage output DC voltage reaches a target level.

18 Claims, 8 Drawing Sheets

(56) References Cited

U.S. PATENT DOCUMENTS

| | | | |
|---|---|---|---|
| 7,977,921 B2* | 7/2011 | Bahai | H02J 7/022 320/140 |
| 8,247,999 B2 | 8/2012 | Chen et al. | |
| 2006/0176038 A1 | 8/2006 | Flatness et al. | |
| 2007/0046270 A1* | 3/2007 | Tsuruya | H02M 3/1582 323/247 |
| 2008/0136260 A1 | 6/2008 | Watanabe et al. | |
| 2009/0237966 A1 | 9/2009 | Soenen et al. | |
| 2009/0278520 A1* | 11/2009 | Perreault | H02M 3/07 323/282 |
| 2010/0309697 A1* | 12/2010 | Werle | H02M 1/4208 363/126 |

FOREIGN PATENT DOCUMENTS

| TW | 200925818 A | 6/2009 |
|---|---|---|
| TW | 200929818 A | 7/2009 |

OTHER PUBLICATIONS

Hsieh, C.Y., et al.; "43.2: A Charge-Reservoir with Buck-Store and Boost-Restore (BSBR) Technique for High Efficient Conversion and Low Cost Solution of RGB LED Display Panels;" SID Digest; 2009; pp. 640-643.

Abdel-Rahman, O., et al.; "Transient Response Improvement in DC-DC Converters Using Output Capacitor Current for Faster Transient Detection;" IEEE; 2007; pp. 157-160.

Su, F., et al.; "Ultra Fast Fixed-Frequency Hysteretic Buck Converter with Maximum Charging Current Control and Adaptive Delay Compensation for DVS Applications;" IEEE Journal of Solid-State Circuits; vol. 43, No. 4; Apr. 2008; pp. 815-822.

Hsieh, C.Y., et al.; Charge-Recycling Buck-Store and Boost-Restore (BSBR) Technique with Dual Outputs for RGB LED Backlight and Flashlight Module; IEEE Transactions on Power Electronics; vol. 24, No. 8; Aug. 2009; pp. 1914-1925.

English abstract translation of TW 200925818 (Published Jun. 16, 2009).

English abstract translation of TW 200923607 (Published Jun. 1, 2009).

English abstract translation of TW 200929818 (Published Jul. 1, 2009).

English abstract translation of TW 200826406 (Published Jun. 16, 2008).

TW Office Action dated Dec. 6, 2012.

* cited by examiner

BUCK-STORE AND BOOST-RESTORE CONVERTER

This application is a continuation application (CA) of U.S. patent application Ser. No. 12/773,140, filed May 4, 2010, which claims the benefit of Taiwan Patent application Serial No. 098140874, filed Nov. 30, 2009, the subject matters of which are incorporated herein by reference.

TECHNICAL FIELD

The disclosure relates in general to a converter, and a buck-store and boost-restore converter, and a buck-store and boost-restore operating system.

BACKGROUND

At present, when an output voltage of a DC-DC converter is switched from a high supply voltage to a low supply voltage, the problems of the too long switching time and the high energy loss tend to occur so that a post-stage circuit cannot be rapidly driven and the energy cannot be saved.

A conventional DC-DC converter provides an additional grounding path to transfer the excess energy to the ground and thus shorten the time of switching from the high supply voltage to the low supply voltage. However, the electric energy transferred to the ground also wastes the energy. Thus, it is an issue to enhance the switching speed and save the energy.

SUMMARY OF THE DISCLOSURE

The disclosure is directed to a buck-store and boost-restore converter capable of storing the excess energy to save the energy when the output voltage of the DC-DC converter is switched from a high supply voltage to a low supply voltage. In addition, the switching speed of the DC-DC converter is advantageously increased and the power loss is advantageously reduced.

According to a first example of the present disclosure, a system is provided. The system includes: a first converter for receiving a pre-stage input DC voltage from a power source, and providing a pre-stage output DC voltage including a first DC voltage or a second DC voltage; a modulator, coupled to the first converter, the modulator controlling the first converter; a second converter, coupled to the first converter; and a controller, coupled to the second converter, the controller controlling an operation mode of the second converter and notifying the modulator about the operation mode of the second converter. The modulator and the controller receive an external voltage indication signal indicating whether the pre-stage output DC voltage is the first DC voltage or the second DC voltage. The modulator controls the first converter to output the pre-stage output DC voltage based on the voltage indication signal. The modulator notifies the controller about whether the pre-stage output DC voltage reaches a target level.

The disclosure will become apparent from the following detailed description of the preferred but non-limiting embodiments. The following description is made with reference to the accompanying drawings.

DETAILED DESCRIPTION OF THE DISCLOSURE

Figure 1:
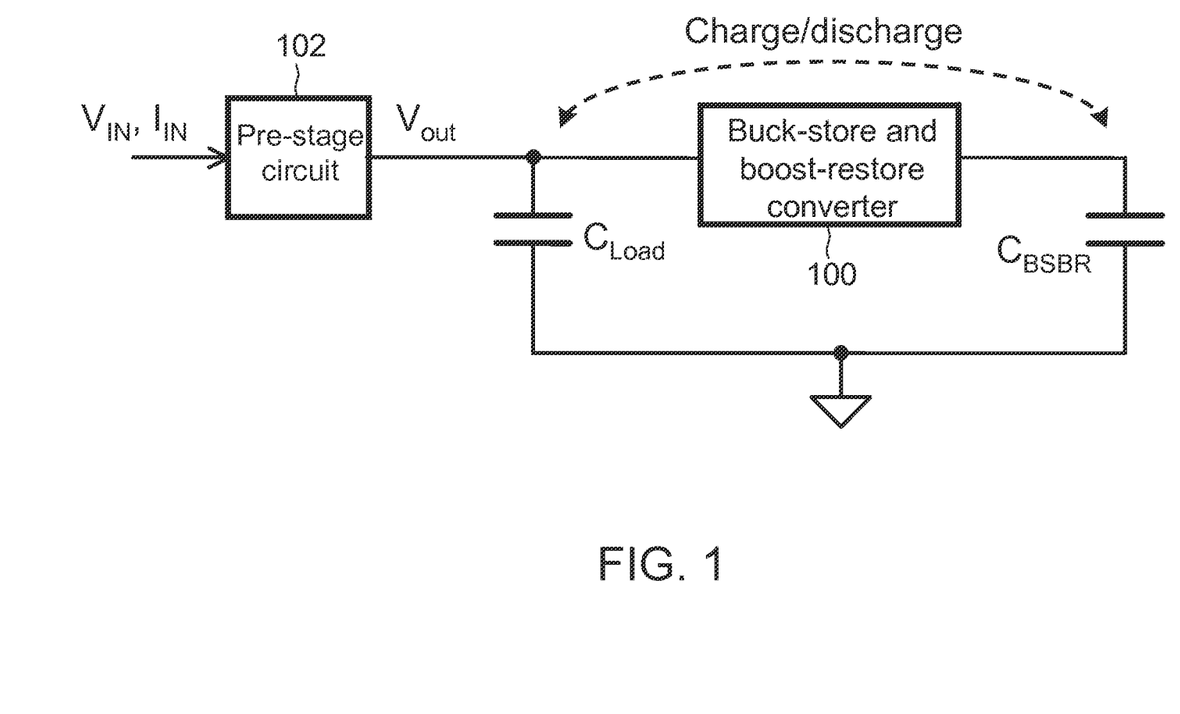
FIG. 1 is a schematic illustration showing a buck-store and boost-restore converter according to an embodiment of the disclosure.

FIG. 1 is a schematic illustration showing a buck-store and boost-restore converter 100 according to an embodiment of the disclosure. As shown in FIG. 1, the buck-store and boost-restore converter 100 is to be electrically connected to a pre-stage circuit 102 and a first capacitive load $C_{Load}$. The pre-stage circuit 102 receives a pre-stage input DC voltage $V_{IN}$ and a pre-stage input DC current $I_{IN}$, and provides a pre-stage output DC voltage $V_{out}$ to the first capacitive load $C_{Load}$. The pre-stage output DC voltage $V_{out}$ may include a first DC voltage $V_1$ or a second DC voltage $V_2$. The buck-store and boost-restore converter 100 having an inductance element (not shown in FIG. 1) is to be electrically connected to a second capacitive load $C_{BSBR}$.

When the pre-stage output DC voltage $V_{out}$ is reduced from the first DC voltage $V_1$ to the second DC voltage $V_2$, the inductance element serves as a current source with a variable current to output a current to the second capacitive load $C_{BSBR}$, so as to transfer the electric energy, stored in the first capacitive load $C_{Load}$, to the second capacitive load $C_{BSBR}$. When the pre-stage output DC voltage $V_{out}$ is raised from the second DC voltage $V_2$ to the first DC voltage $V_1$, the inductance element serves as a current source with a variable current to output a current to the first capacitive load $C_{Load}$, so as to transfer the electric energy, stored in the second capacitive load $C_{BSBR}$, to the first capacitive load $C_{Load}$.

Figure 2:
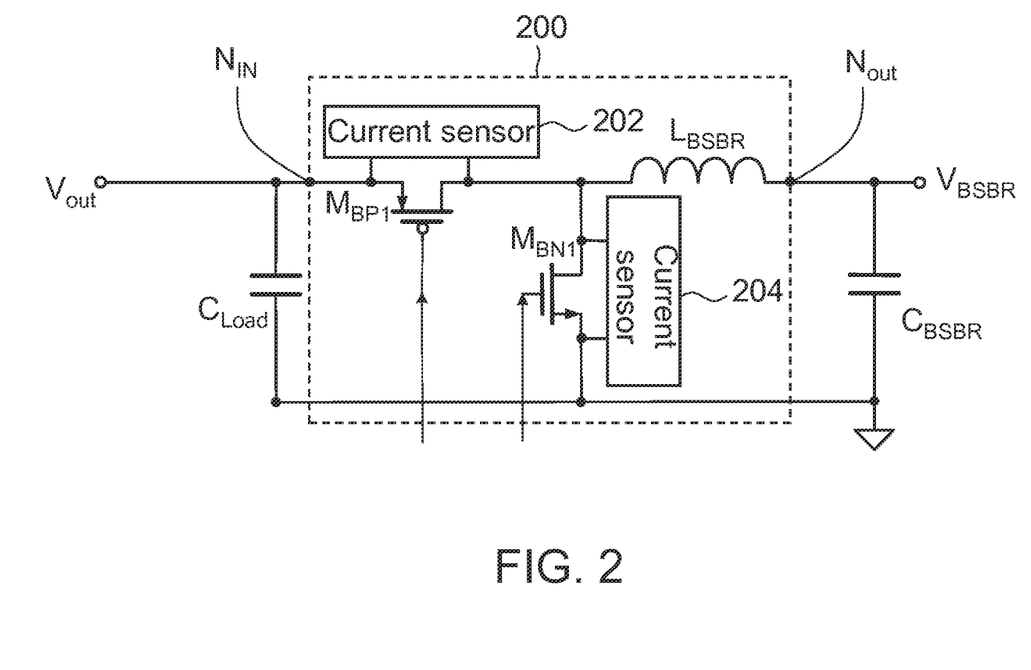
FIG. 2 shows an example of a detailed circuit diagram of the buck-store and boost-restore converter of FIG. 1.

The details will be further described in the following. FIG. 2 shows an example of a detailed circuit diagram of the buck-store and boost-restore converter of FIG. 1. Referring to FIG. 2, the buck-store and boost-restore converter 200 includes an input terminal $N_{IN}$, a first switch $M_{BP1}$, an inductance element $L_{BSBR}$, a second switch $M_{BN1}$ and an output terminal $N_{out}$. The input terminal $N_{IN}$ coupled to the first capacitive load $C_{Load}$ receives the pre-stage output DC voltage $V_{out}$. The first switch $M_{BP1}$ is coupled to the input terminal $N_{IN}$. The inductance element $L_{BSBR}$ has a first end coupled to the first switch $M_{BP}$. The second switch $M_{BN1}$ is coupled between the inductance element $L_{BSBR}$ and a constant voltage. The output terminal $N_{out}$ is coupled to a second end of the inductance element $L_{BSBR}$, and further to the second capacitive load $C_{BSBR}$.

When the pre-stage output DC voltage $V_{out}$ is reduced from the first DC voltage $V_1$ to the second DC voltage $V_2$, the converter 200 enters a buck-store operation mode, and the first switch $M_{BP1}$ and the second switch $M_{BN1}$ are alternately turned on so that the inductance element $L_{BSBR}$ outputs a current to the second capacitive load $C_{BSBR}$ to transfer the electric energy, stored in the first capacitive load $C_{Load}$, to the second capacitive load $C_{BSBR}$.

When the pre-stage output DC voltage $V_{out}$ is raised from the second DC voltage $V_2$ to the first DC voltage $V_1$, the converter 200 enters a boost-restore operation mode, and the first switch $M_{BP1}$ and the second switch $M_{BN1}$ are alternately turned on so that the inductance element $L_{BSBR}$ outputs a current to the first capacitive load $C_{Load}$ to transfer the electric energy, stored in the second capacitive load $C_{BSBR}$, to the first capacitive load $C_{Load}$.

The converter 200 may further include a first current sensor 202 and a second current sensor 204. The first current sensor 202 coupled to the first switch $M_{BP1}$ senses the current flowing through the inductance element $L_{BSBR}$. The first current sensor 202 obtains the current of the inductance element $L_{BSBR}$ by sensing the current flowing through the first switch $M_{BP}$, for example. The second current sensor 204 coupled to the second switch $M_{BN1}$ also senses the current flowing through the inductance element $L_{BSBR}$. The second current sensor 204 also obtains the current of the inductance element $L_{BSBR}$ by sensing the current flowing through the second switch $M_{BN1}$, for example. In this example, the constant voltage is a ground voltage, for example.

Figure 3A:
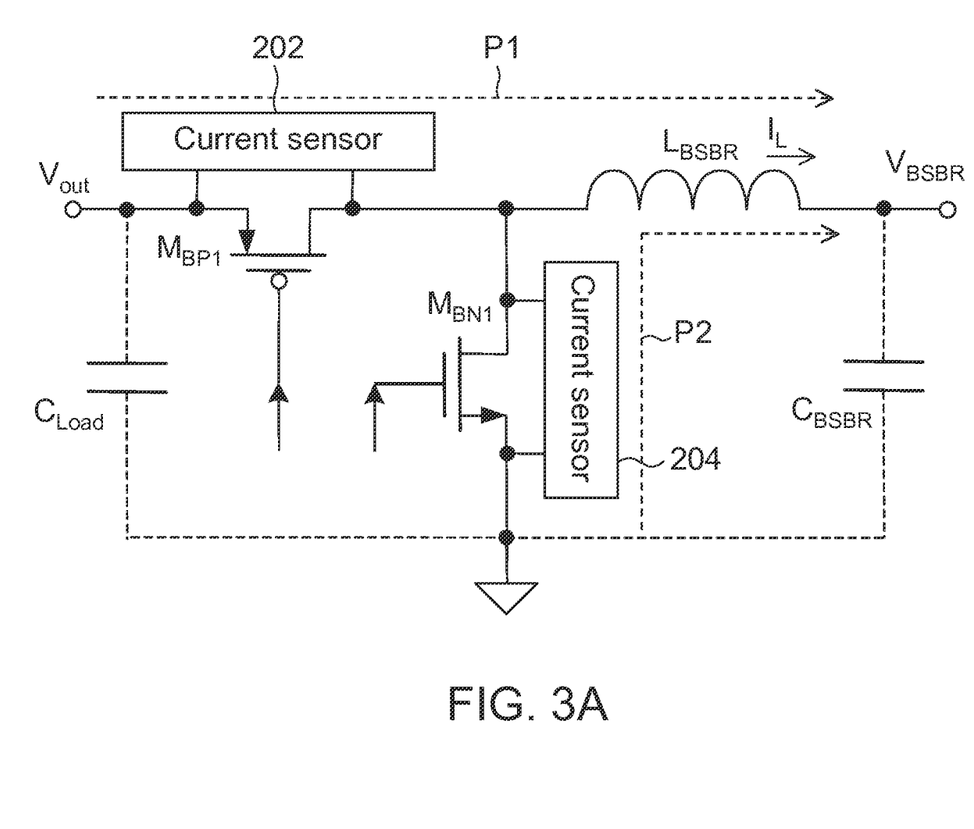
FIG. 3A is an equivalent circuit diagram showing the converter of FIG. 2 in a buck-store operation mode.
Figure 4:
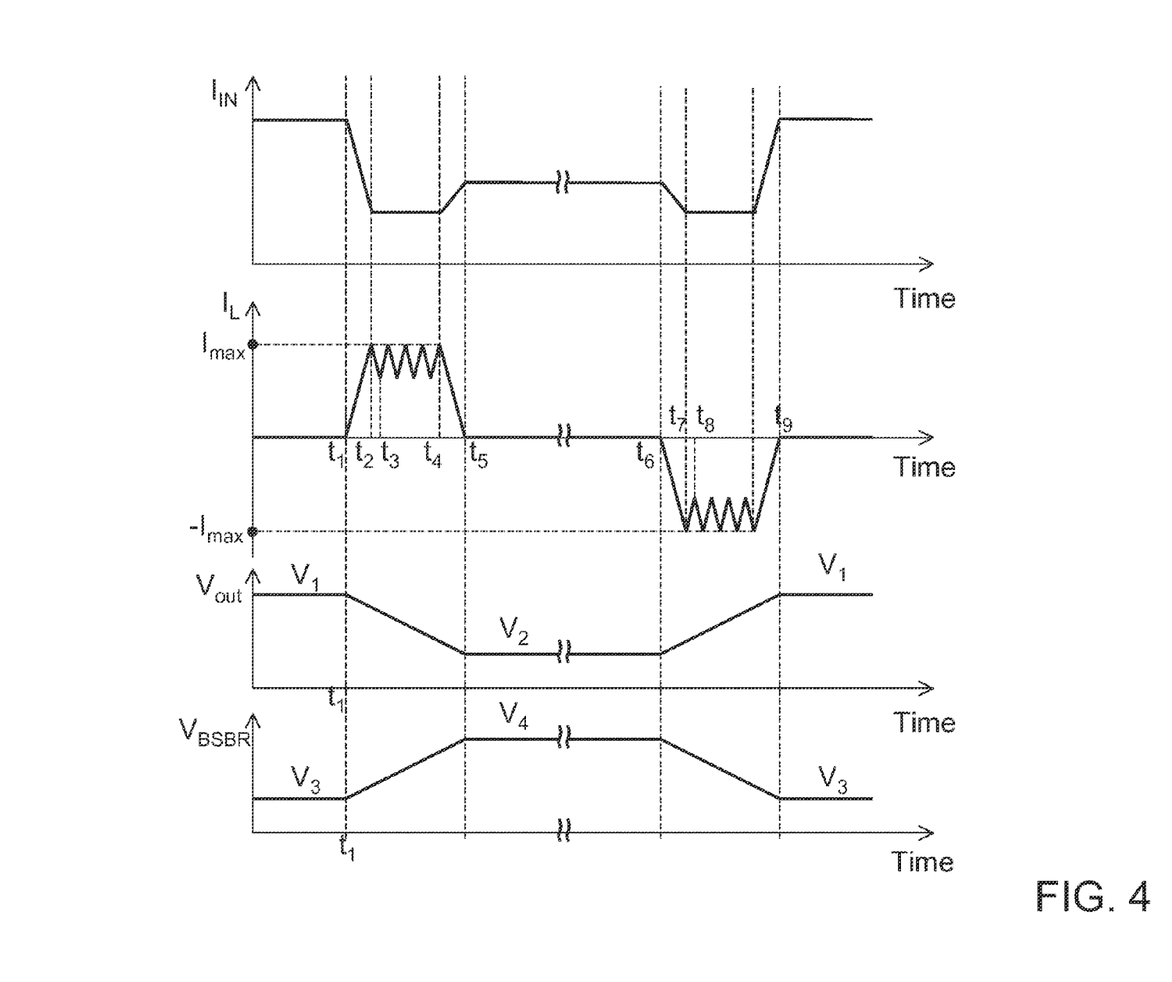
FIG. 4 shows waveforms of a current $I_L$ of an inductance element $L_{BSBR}$, a pre-stage output DC voltage $V_{out}$, and a voltage $V_{BSBR}$ of an output terminal $N_{out}$ in an example.

FIG. 3A is an equivalent circuit diagram showing the converter 200 of FIG. 2 in a buck-store operation mode. FIG. 4 shows waveforms of a current $I_L$ of an inductance element $L_{BSBR}$, a pre-stage output DC voltage $V_{out}$, and a voltage $V_{BSBR}$ of an output terminal $N_{out}$ in an example. As shown in FIGS. 3A and 4, the current of the pre-stage input DC current $I_{IN}$ relates to the energy of the power source (not shown) received by the pre-stage circuit 102. In the buck-store operation mode, the first switch $M_{BP1}$ is turned on before the second switch $M_{BN1}$ is turned on. At the time point $t_1$, the first switch $M_{BP1}$ is turned on. Thereafter, the current outputted from the first capacitive load $C_{Load}$ flows through the first switch $M_{BP1}$ and the inductance element $L_{BSBR}$ along a current path P1 to charge the second capacitive load $C_{BSBR}$. Thus, the current $I_L$ is continuously raised, the pre-stage output DC voltage $V_{out}$ is gradually reduced from the first DC voltage $V_1$, and the voltage $V_{BSBR}$ of the output terminal $N_{out}$ starts to raise from a third DC voltage $V_3$.

At the time point $t_2$, when the first current sensor 202 senses that the current $I_L$ of the inductance element $L_{BSBR}$ exceeds an upper bound value $I_{max}$, the first switch $M_{BP1}$ is turned off. At this time, the second switch $M_{BN1}$ is turned on. Based on the continuous property of the current of the inductance element $L_{BSBR}$, the same current flows from the second switch $M_{BN1}$ to the second capacitive load $C_{BSBR}$ through the inductance element $L_{BSBR}$, as shown by a current path P2. Thus, the current $I_L$ of the inductance element $L_{BSBR}$ is gradually reduced.

At this time, the first current sensor 202 may be regarded as a maximum current sensor. The allowable maximum transfer current of the converter 200 may be set by the use of the first current sensor 202.

At the time point $t_3$, the first switch $M_{BP1}$ is again turned on and the second switch $M_{BN1}$ is turned off. At this time, the current $I_L$ of the inductance element $L_{BSBR}$ gradually increases. The current outputted from the first capacitive load $C_{Load}$ flows through the first switch $M_{BP1}$ and the inductance element $L_{BSBR}$ along the current path P1 to charge the second capacitive load $C_{BSBR}$. After several times of repeating, the second switch $M_{BN1}$ is continuously turned on after the time point $t_4$ to gradually reduce the current $I_L$ of the inductance element $L_{BSBR}$.

At the time point $t_5$, the second current sensor 204 senses that the current $I_L$ of the inductance element $L_{BSBR}$ is substantially equal to zero, and the second switch $M_{BN1}$ is turned off. At this time, the second current sensor 204 may be regarded as a zero current sensor. According to the operations from the time points $t_1$ to $t_5$, when the pre-stage output DC voltage $V_{out}$ is reduced from the first DC voltage $V_1$ to the second DC voltage $V_2$, the excess energy in the first capacitive load $C_{Load}$ is stored in the second capacitive load $C_{BSBR}$ so that the voltage $V_{BSBR}$ of the output terminal $N_{out}$ is raised to a fourth DC voltage $V_4$.

Compared with the condition where all the switches are turned off when the inductance element $L_{BSBR}$ still has a current flowing therethrough so that the inductance element $L_{BSBR}$ becomes floating and the great potential difference is generated, this embodiment can prevent the switches from withstanding the great potential difference and thus reduce the possibility of damage caused by the high potential difference.

Figure 3B:
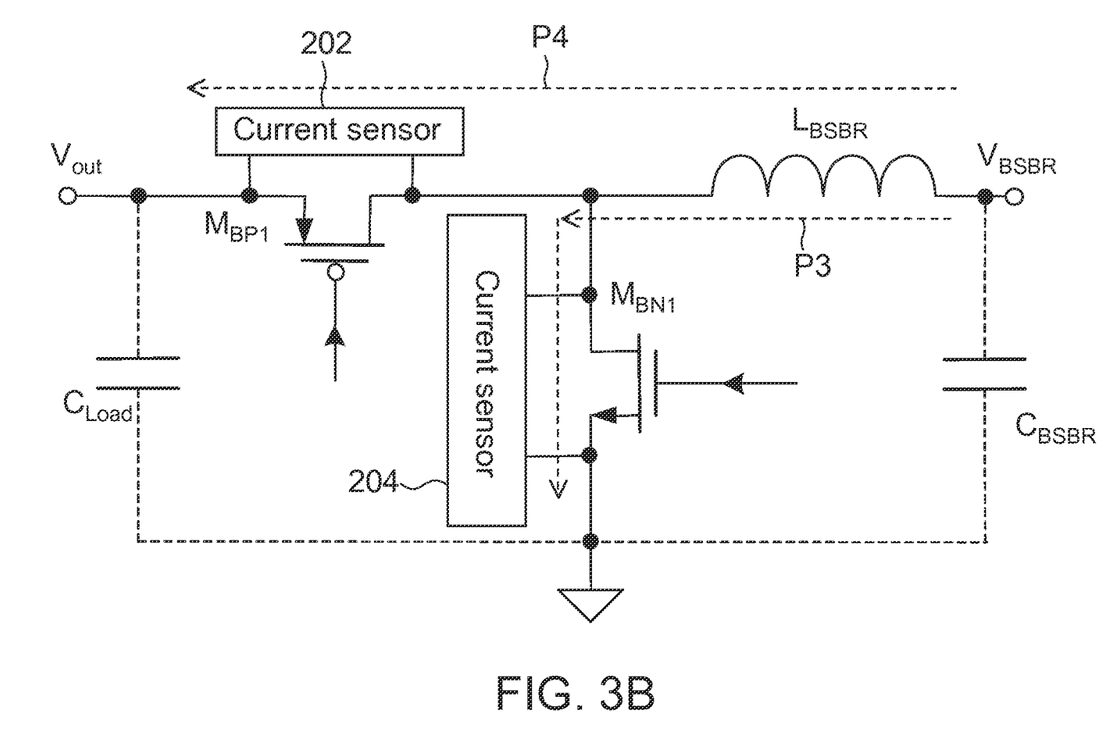
FIG. 3B is an equivalent circuit diagram showing the converter of FIG. 2 in a boost-restore operation mode.

FIG. 3B is an equivalent circuit diagram showing the converter 200 of FIG. 2 in a boost-restore operation mode. As shown in FIGS. 3B and 4, in the boost-restore operation mode, the second switch $M_{BN1}$ is turned on before the first switch $M_{BP1}$ is turned on. At the time point $t_6$, the second switch $M_{BN1}$ is turned on. Thereafter, the current outputted from the second capacitive load $C_{BSBR}$ flows through the second switch $M_{BN1}$ to the ground along a current path P3.

At the time point $t_7$, when the second current sensor 204 senses that the current $I_L$ of the inductance element $L_{BSBR}$ exceeds the upper bound value Imax, the second switch $M_{BN1}$ is turned off. At this time, the first switch $M_{BP1}$ is turned on, and the current flows from the second capacitive load $C_{BSBR}$ to the first capacitive load $C_{Load}$ through the inductance element $L_{BSBR}$ and the first switch $M_{BP1}$, as shown by a current path P4.

At this time, the second current sensor 204 may be regarded as a maximum current sensor. The allowable maximum transfer current of the converter 200 may be set by the use of the second current sensor 204.

At the time point $t_8$, the second switch $M_{BN1}$ is again turned on, and the first switch $M_{BP1}$ is turned off. After several times of repeating, at the time point $t_9$, when the first current sensor 202 senses that the current $I_L$ of the inductance element $L_{BSBR}$ is substantially equal to zero, the first switch $M_{BP1}$ is turned off. At this time, the first current sensor 202 may be regarded as a zero current sensor. According to the operations from the time points $t_6$ to $t_9$, the pre-stage output DC voltage $V_{out}$ is raised to the first DC voltage $V_1$, and the electric energy originally stored in the second capacitive load $C_{BSBR}$ is transferred to the first capacitive load $C_{Load}$. Thus, the electric energy originally stored in the second capacitive load $C_{BSBR}$ may be reused to decrease the electric energy consumed when the pre-stage circuit 102 is charging the first capacitive load $C_{Load}$. In addition, this embodiment further has the advantage of making the first capacitive load $C_{Load}$ precisely and quickly reach the target level (e.g., the first DC level $V_1$ or the second DC level $V_2$).

According to the current of the pre-stage input DC current $I_{IN}$, it is obtained that when the buck-store operation is performed from the time points $t_1$ to $t_5$, the electric energy of the first capacitive load $C_{Load}$ is transferred to the second capacitive load $C_{BSBR}$. So, the pre-stage circuit 102 receives the less electric energy from the power source, and the current of the pre-stage input DC current $I_{IN}$ is also lower than that in other periods. When the boost-restore operation is performed from the time points $t_6$ to $t_9$, the electric energy of the second capacitive load $C_{BSBR}$ is transferred to the first capacitive load $C_{Load}$. So, the pre-stage circuit 102 receives the less electric energy from the power source, and the current of the pre-stage input DC current $I_{IN}$ is also lower than that in other periods.

Compared with the technique of charge sharing wherein only two capacitors are connected in parallel, this embodiment can effectively reduce the power loss of the overall circuit and reach the higher energy conversion efficiency.

Figure 5:
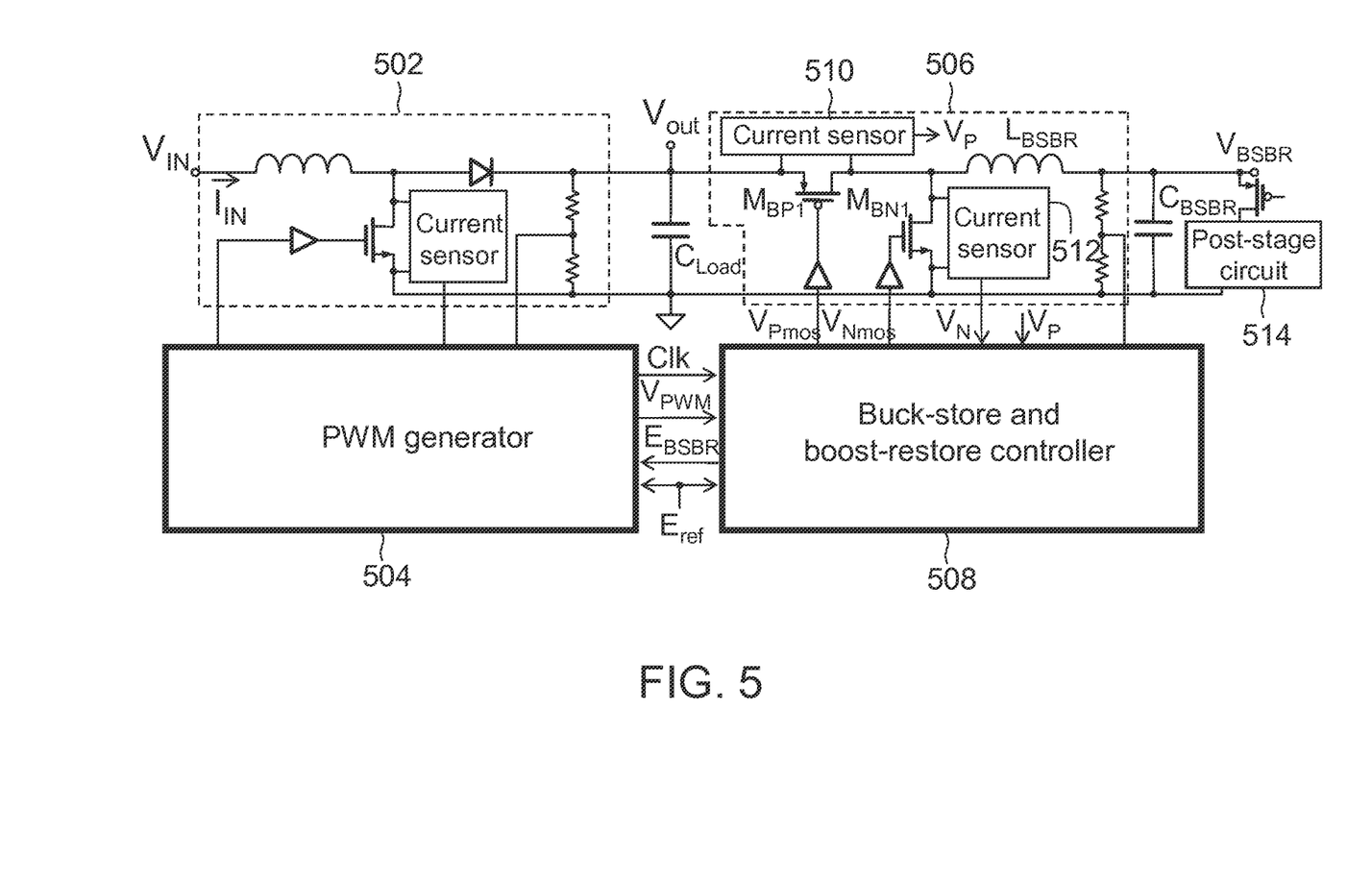
FIG. 5 is a circuit block diagram showing an example of an operation of the converter of FIG. 2.

The circuit block diagram of an example of the operation of the converter of FIG. 2 is implemented by taking a DC-DC converter 502 as an example of the pre-stage circuit 102, as shown in FIG. 5. The DC-DC converter 502 is controlled by a pulse width modulation (PWM) generator 504, and a buck-store and boost-restore converter 506 is controlled by a buck-store and boost-restore controller 508. The PWM generator 504 outputs a clock signal Clk and a signal $V_{PWM}$ to the controller 508, which outputs a signal $E_{BSBR}$ to the PWM generator 504. The PWM generator 504 and the controller 508 receive a signal $E_{ref}$ from the outside. The controller 508 further receives signals $V_P$ and $V_N$ respectively outputted from current sensors 510 and 512. The controller 508 generates a signal $Clk_{BSBR}$ according to the clock signal Clk and the signal $E_{BSBR}$, and generates signals $V_{Pmos}$ and $V_{Nmos}$, which respectively control the first switch $M_{BP1}$ and the second switch $M_{BN1}$, according to the signals $V_P$ and $V_N$ and the signal $Clk_{BSBR}$.

The signal $E_{ref}$ controls that the output DC voltage $V_{out}$ is to be converted into which DC level. For example, when the signal $E_{ref}$ is enabled, it represents that the PWM generator 504 should control the DC-DC converter 502 to output the first DC voltage $V_1$. When the signal $E_{ref}$ is disabled, it represents that the PWM generator 504 should control the DC-DC converter 502 to output the second DC voltage $V_2$. The signal $E_{BSBR}$ indicates whether the converter 506 should enter the buck-store operation mode or the boost-restore operation mode. The signal $V_{PWM}$ indicates whether the output DC voltage $V_{out}$ of the DC-DC converter 502 reaches the target level.

Figure 6:
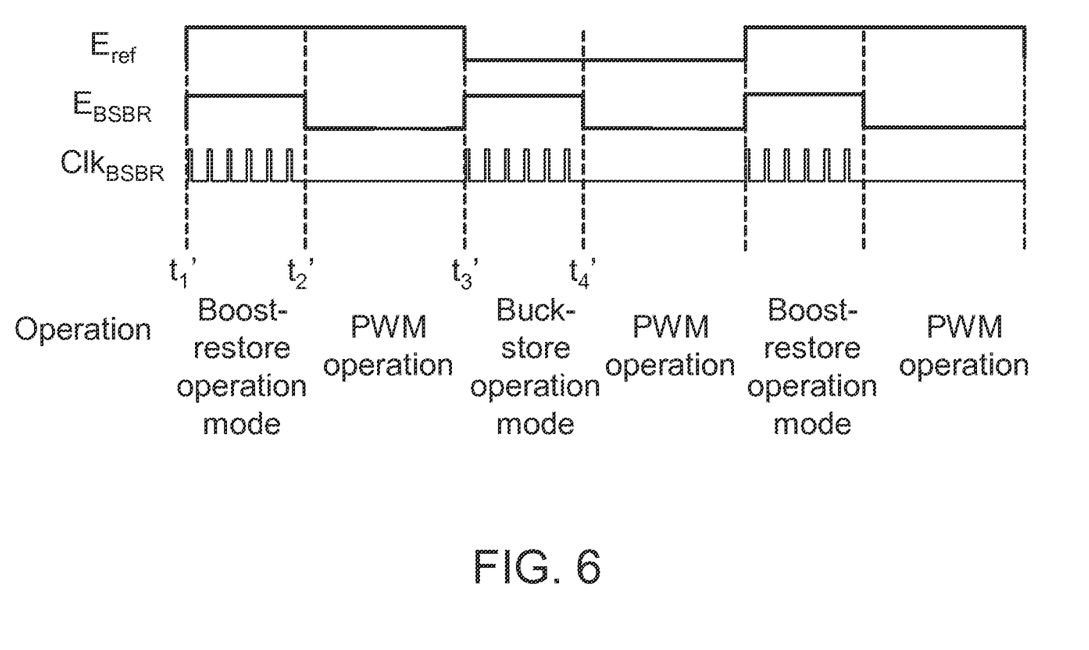
FIG. 6 shows waveforms of signals $E_{ref}$ and $E_{BSBR}$ in an example.

FIG. 6 shows waveforms of signals $E_{ref}$, $E_{BSBR}$ and $Clk_{BSBR}$ in an example. At the time point $t_1'$, when the level of the signal $E_{ref}$ is converted, it represents that the output DC voltage $V_{out}$ will be changed, so the signal $E_{BSBR}$ is turned into enabled, and the converter 506 enters the boost-restore operation mode. At the time point $t2'$, the output DC voltage $V_{out}$ has reached the target level, so the signal $E_{BSBR}$ is turned into disabled, and the converter 506 is controlled to work in the typical PWM operation.

At the time point t3', the level of the signal $E_{ref}$ is converted, the signal $E_{BSBR}$ is turned into enabled, and the converter 506 enters the buck-store operation mode. At the time point t4', the output DC voltage $V_{out}$ has reached the target level, so the signal $E_{BSBR}$ is turned into disabled, and the converter 506 is control to have the typical PWM operation.

When the converter 506 is controlled to work in the typical PWM operation, the electric energy stored in the second capacitive load $C_{BSBR}$ may be provided to a post-stage circuit 514. At this time, the converter 506 may perform the function of a DC-DC converter.

The converter 506 can be selectively controlled to work in the typical PWM operation, and may also be selectively controlled to work in a pulse frequency modulation (PFM) operation, or a sigma-delta modulation operation.

Although the pre-stage circuit 102 is the DC-DC converter 502 is illustrated in the example of FIG. 5, the pre-stage circuit 102 is not limited thereto. The pre-stage circuit 102 may also be a low drop regulator.

In addition, the pre-stage circuit 102 may receive the power coming from the external power source or battery, and may also receive the power of a solar energy electrode plate (also referred to as a solar cell). Thus, when the sunlight is stronger, the generated excess energy may be stored in the second capacitive load $C_{BSBR}$ so that the stored energy may be utilized when the sunlight is not stronger.

The pre-stage output DC voltage $V_{out}$ outputted from the pre-stage circuit 102 may be provided to multiple light-emitting diodes (LEDs) connected in series. For example, in the backlight module of the display panel using the color sequence technique, the red LEDs connected in series, the green LEDs connected in series and the blue LEDs connected in series are sequentially lighted up. Applying the buck-store and boost-restore converter of this embodiment can effectively achieve the effects of saving the energy and increasing the driving speed when the pre-stage output DC voltage $V_{out}$ is switched to different levels to provide different levels of driving voltage to drive the LEDs with different colors.

In addition, the pre-stage output DC voltage $V_{out}$ may also be provided to a central processing unit (CPU). The typical CPU requires different control voltages in different modes (e.g., a standby mode or a typical operation mode). Applying the buck-store and boost-restore converter of this embodiment can achieve the effects of saving the energy and the rapid operation when the pre-stage output DC voltage $V_{out}$ controls the CPU.

Figure 7:
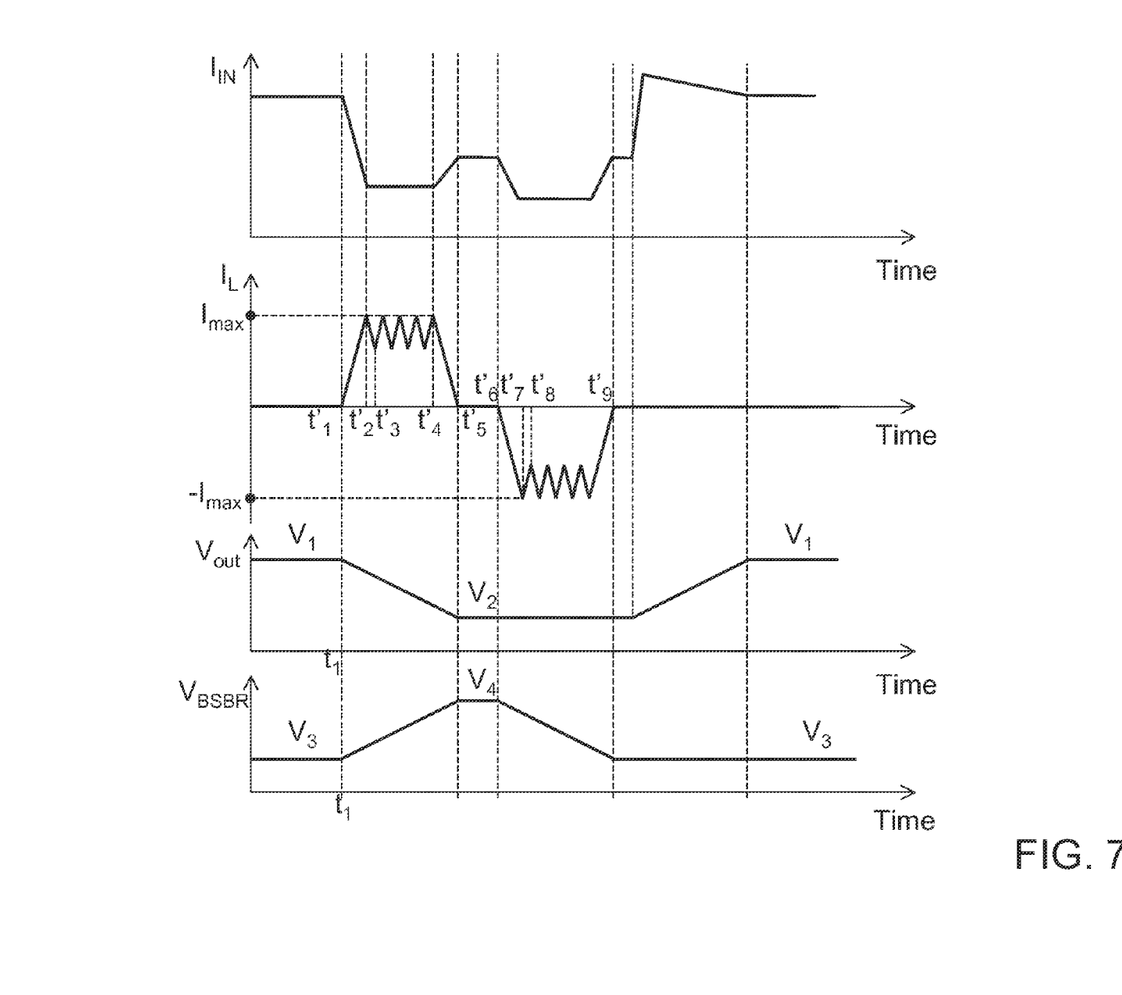
FIG. 7 shows waveforms of a pre-stage input DC current $I_{IN}$, a current $I_L$ of an inductance element $L_{BSBR}$, a pre-stage output DC voltage $V_{out}$ and a voltage $V_{BSBR}$ of an output terminal $N_{out}$ corresponding to an example of the other embodiment.

FIG. 7 shows waveforms of a pre-stage input DC current $I_{IN}$, a current $I_L$ of an inductance element $L_{BSBR}$, a pre-stage output DC voltage $V_{out}$ and a voltage $V_{BSBR}$ of an output terminal $N_{out}$ corresponding to an example of the other embodiment. What is different from the embodiment of FIG. 4 is that, when the boost-restore operation is performed from the time points $t'_6$ to $t'_9$, the electric energy of the second capacitive load $C_{BSBR}$ firstly serves as the electric energy, outputted from the pre-stage circuit 102, to drive the to-be-driven circuit, such as the LEDs connected in series or the CPU.

Consequently, the pre-stage circuit 102 needs not to receive a lot of electric energy from the power source in the period from the time points $t'_6$ to $t'_9$, and can achieve the object of driving the to-be-driven circuit. As shown in FIG. 7, the average current from the time points $t'_6$ to $t'_9$ may be smaller than the currents in other periods. After the time point $t'_{10}$, if the voltage of the pre-stage output DC voltage $V_{out}$ has to be raised, the power source can provide the electric energy required to raise the voltage of the pre-stage output DC voltage $V_{out}$. As shown in FIG. 7, it is obtained that the average current from the time points $t'_{10}$ to $t'_{11}$ may be higher than that in any other period.

In addition, according to the suitable design of the switch control, the other embodiment of the disclosure can achieve the function of the boost-store and buck-restore converter.

The buck-store and boost-restore converter according to each embodiment of the disclosure can store the excess energy when the output voltage of the DC-DC converter is switched from the high supply voltage to the low supply voltage and can utilize the stored energy when the output voltage of the DC-DC converter is switched from the low supply voltage to the high supply voltage. So, the electric energy consumption of the pre-stage circuit can be effectively reduced. In addition, the advantages of increasing the switching speed of the DC-DC converter and reducing the power loss may further be obtained.

While the disclosure has been described by way of examples and in terms of preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system, comprising:
   a first converter for receiving a pre-stage input DC voltage from a power source, and providing a pre-stage output DC voltage which includes a first DC voltage or a second DC voltage;
   a modulator, coupled to the first converter, the modulator controlling the first converter;
   a second converter, coupled to the first converter; and
   a controller, coupled to the second converter, the controller controlling an operation mode of the second converter and notifying the modulator about the operation mode of the second converter,
   wherein:
   the modulator and the controller receive an external voltage indication signal indicating whether the pre-stage output DC voltage is the first DC voltage or the second DC voltage;
   the modulator controls the first converter to output the pre-stage output DC voltage based on the voltage indication signal; and
   the modulator notifies the controller about whether the pre-stage output DC voltage reaches a target level.

2. The system according to claim 1, wherein the second converter comprises:
   an input terminal, coupled to a first capacitive load, for receiving the pre-stage output DC voltage;
   a first switch coupled to the input terminal;
   an inductance element having a first end coupled to the first switch;
   a second switch coupled between the inductance element and a constant voltage; and
   an output terminal coupled to a second end of the inductance element and a second capacitive load, wherein:
   when the pre-stage output DC voltage is reduced from the first DC voltage to the second DC voltage, the second converter enters a buck-store operation mode and the first switch and the second switch are alternately turned on, and accordingly that the inductance element outputs a current to the second capacitive load to transfer electric energy, stored in the first capacitive load, to the second capacitive load; and
   when the pre-stage output DC voltage is raised from the second DC voltage to the first DC voltage, the second converter enters a boost-restore operation mode and the first switch and the second switch are alternately turned on, and accordingly the inductance element outputs a current to the first capacitive load to transfer electric energy, stored in the second capacitive load, to the first capacitive load.

3. The system according to claim 2, wherein in the buck-store operation mode, the first switch is turned on before the second switch is turned on.

4. The system according to claim 2, wherein in the boost-restore operation mode, the second switch is turned on before the first switch is turned on.

5. The system according to claim 2, wherein the second converter further comprising:
   a first current sensor, coupled to the first switch, for sensing a current flowing through the inductance element; and
   a second current sensor, coupled to the second switch, for sensing the current flowing through the inductance element.

6. The system according to claim 5, wherein in the buck-store operation mode, the first switch is turned off when the first current sensor senses that the current of the inductance element exceeds an upper bound value, and the second switch is turned off when the second current sensor senses that the current of the inductance element is substantially equal to zero.

7. The system according to claim 5, wherein in the boost-restore operation mode, the second switch is turned off when the second current sensor senses that the current of the inductance element exceeds an upper bound value, and the first switch is turned off when the first current sensor senses that the current of the inductance element is substantially equal to zero.

8. The system according to claim 5, wherein in the boost-restore operation mode, the second switch is turned off when the second current sensor senses that the current of the inductance element exceeds an upper bound value, and the first switch is turned off when the first current sensor senses that the current of the inductance element is substantially equal to zero.

9. The system according to claim 2, wherein the constant voltage is a ground voltage.

10. The system according to claim 2, wherein the first converter is a DC-DC converter.

11. The system according to claim 2, wherein the first converter receives a power of a solar energy electrode plate.

12. The system according to claim 2, wherein the first converter is a low drop regulator.

13. The system according to claim 2, wherein the modulator controls the second converter by a pulse width modulation (PWM) operation.

14. The system according to claim 2, wherein the modulator controls the second converter by a pulse frequency modulation (PFM) operation.

15. The system according to claim 2, wherein the modulator controls the second converter by a sigma-delta modulation operation.

16. The system according to claim 2, wherein the second converter further selectively provides electric energy to a post-stage circuit.

17. The system according to claim 2, wherein the pre-stage output DC voltage is provided to a plurality of light-emitting diodes (LEDs) connected in series.

18. The system according to claim 2, wherein the pre-stage output DC voltage is provided to a central processing unit (CPU).

* * * * *